United States Patent Office 2,875,619
Patented Mar. 3, 1959

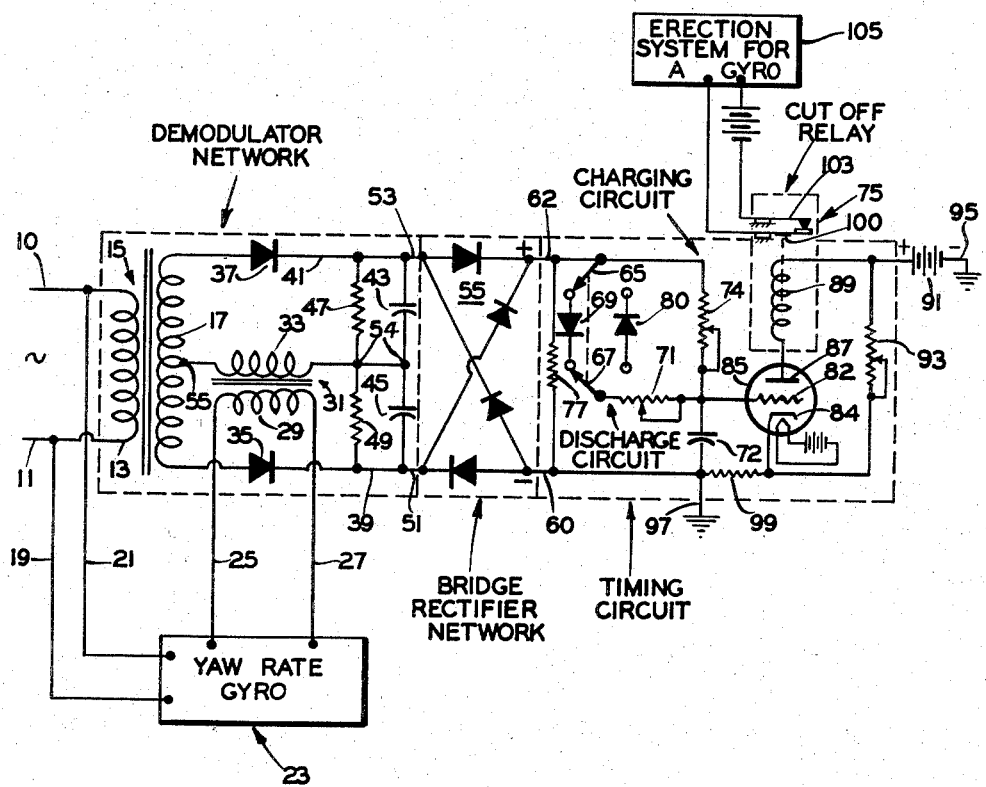

2,875,619
GYRO ERECTION CUTOUT DELAY CIRCUIT

Vincent A. Wilhelm, Mahwah, and Harold Moreines, Hillside, N. J., assignors to Bendix Aviation Corporation, Teterboro, N. J., a corporation of Delaware Application February 4, 1957, Serial No. 637,928

5 Claims. (Cl. 74—5.41)

The invention relates to a gyro erection cutoff time delay circuit and, more particularly, to a time delay circuit supplied with an input signal from a yaw rate gyro and arranged to operate a control relay so as to provide a cutoff of the erection system of a vertical gyro of an aircraft when the craft turns at or above a given rate, and a relatively rapid cut-in of the erection system when the craft comes out of the turn.

An object of the invention is to provide novel means for providing a time delay in the cutout of the erection system for an aircraft gyro when the craft enters a turn, and a relatively rapid cut-in of the erection system when the craft comes out of the turn.

Another object of the invention is to provide novel means for accomplishing the aforenoted sequential operation in which there is provided a time delay circuit including a demodulator, a bridge rectifier and a time delay means in the control circuit of a thermionic valve utilizing a cutoff relay in the plate circuit to effect the aforenoted control operation.

Another object of the invention is to provide a novel control circuit to effect the aforenoted control operation and means arranged so as to sharply reduce the proportion of the voltage output to the bridge due to noise from the signal source.

Another object of the invention is to provide in the time delay circuit novel operator-operative switch means to effectively reverse the aforenoted control operation so as to effect a rapid cutout of the erecting system for the gyro upon a turn of the craft at or above a given rate, and a time delay in the cut-in of the erection system when the craft comes out of the turn.

These and other objects and features of the invention are pointed out in the following description in terms of the embodiment thereof which is shown in the accompanying drawing. It is to be understood, however, that the drawing is for the purpose of illustration only and is not defined as a definition of the limits of the invention, reference being had to the appended claims for this purpose.

In the drawing:

The drawing is a schematic wiring diagram of a time delay circuit embodying the invention to control the operation of an erection system for a vertical gyro of an aircraft of conventional type and operated by a signal from a yaw rate gyro which may also be of a conventional type.

Referring to the drawing, there is applied across the lines 10 and 11 a reference voltage from a suitable source of alternating current to energize a primary winding 13 of a transformer 15 having a secondary winding 17. The reference voltage is also supplied through lines 19 and 21 to the input of a yaw rate gyro, indicated schematically by the numeral 23, and which may be of a suitable type, arranged upon a turn of the aircraft at or above a given rate to apply an A. C. signal voltage across the output lines 25 and 27 leading to a primary winding 29 of a transformer 31 having a secondary winding 33 inductively coupled thereto.

Secondary windings 17 and 33 of the transformers 15 and 31, respectively, are connected in a demodulator network including rectifiers 35 and 37 connected at either end of the reference voltage transformer secondary 17. Leading from the rectifiers 35 and 37 are conductors 39 and 41 to which are connected condensers 43 and 45, respectively, charged by successive half waves of electrical energy applied through the rectifiers 35 and 37. Resistors 47 and 49 are shunted across the condensers 43 and 45, respectively, providing leakage paths so that, in the absence of a signal, these condensers 43 and 45 will have equal and opposite charges and no voltage will be applied across output conductors 51 and 53 leading to a rectifier bridge network 55 of conventional type.

The secondary winding 33 of transformer 31 connects the midpoints 54 of the condensers 43—45 and resistors 47—49 with midpoint 55 of the secondary winding 17 of transformer 15 so that the induced voltage in the secondary winding 33 is in synchronism with the reference voltage applied to the secondary winding 17, or 180° out of phase therewith.

The demodulator network is balanced so that equipotentials exist at 51 and 53 in the absence of a yaw rate signal at 33. Now in a turn, a signal at 33 is added vectorially to the reference signal at 17. The demodulator is then unbalanced so that the potentials across capacitors 43 and 45 differ. Depending on the direction of the turn, the potential at 53 will be either higher or lower than that at 51. For a higher (more positive) potential at 53, current flows through upper diode of bridge 55, resistor 77, and the diode connecting points 60 and 51. For a higher potential at point 51, current flows through diode from 51 to 62, resistor 77, and returns through diode from 60 to 53. Thus, for either direction of turn current flows through load resistor 77 in the same direction, establishing a potential at point 62 which is positive with respect to ground, whereas for the balanced condition, there is no current flow through resistor 77 hence point 62 is at ground potential.

Accordingly, in flight operation, depending upon whether or not the craft is turning in a clockwise or counter-clockwise direction, the signal voltage at winding 33 will be in phase or 180° out of phase with that induced in winding 17 so that the signal secondary voltage at the winding 33 will increase the voltage through one of the rectifiers (35 or 37) and be subtracted from the voltage of the other rectifier (35 or 37) so that the voltage across one condenser 43 or 45 will be increased and the voltage across the other condenser 43 or 45 will be lowered. This will apply a resultant voltage to the input lines 51 and 53 of the bridge rectifier 55 which will, in turn, supply to the output lines 60 and 62 of the bridge rectifier network a D. C. voltage having the polarity indicated and corresponding to the resultant voltage from the demodulator network.

However, when the signal secondary voltage at the winding 33 reaches the amplitude of the reference secondary voltage at winding 17, there will be no voltage output from the rectifier 35 or 37 in the counterbalanced circuit. If for example such rectifier be the rectifier 35, then if the signal voltage at winding 33 increases further, this will produce a current flow through the resistor 47 connected to the latter rectifier 35 producing a voltage drop that will be applied across the corresponding condenser 43 so as to balance the simultaneous increase in the voltage applied from the other rectifier 37 to the other condenser 45. The result will be a substantially constant voltage output to the bridge 55 at all signal voltages at winding 33 of an amplitude equal to or greater than the voltage from the reference transformer secondary 17.

The demodulator circuit has another characteristic that is not obvious. It sharply reduces the proportion of the voltage output to the bridge 55 due to noise from the signal source, since such noise will be random and not in synchronism with the reference voltage induced in winding 17 and, consequently, it will not combine with the latter in the same manner as the signal voltage induced in winding 33, the frequency of which is determined by the reference alternating current applied to lines 10 and 11.

Referring now to the output lines 60 and 62 from the rectifier 55, it will be seen that there is connected into the timing circuit through operator-operative switches 65 and 67, when in the adjusted position shown, a rectifier 69 and resistor 71. The rectifier 69 is so poled that it, in effect, opens the circuit between the resistor 71 and the positive lead 62 from the rectifier 55 so that there is applied to a timing condenser 72 a positive charge through the variable resistor 74, while the opposite plate of the timing condenser 72 is negatively charged through conductor 60. The resistor 74 shunts rectifier 69 and may be adjusted to produce a desired sustained delay in the charging of the timing condenser 72 and in the operation of a cutoff relay 75 controlled thereby.

However, when the signal voltage is reduced so that the condenser 72 may discharge, the rectifier 69 provides a short circuit across the resistor 74 so that the condenser 72 may readily discharge through a circuit including resistor 77, the rectifier 69 and resistor 71 at a relatively more rapid rate established by adjustment of the resistor 71.

Moreover, by manually adjusting the switches 65 and 67 to the right and to a position so as to open the circuit to the rectifier 69 and close the circuit for oppositely poled rectifier 80, it will be seen that the aforenoted charging operation may be readily reversed so as to provide a charging circuit through rectifier 80 of relatively short duration determined by the adjustment of the resistor 71 and a discharge circuit having a relatively sustained delay period determined by the adjustment of the resistor 74.

As shown, the condenser 72 is connected across a control grid 82 and cathode 84 of an electronic valve 85 having a plate 87 and electromagnetic winding 89 connected in the plate circuit to the positive terminal of a suitable battery 91.

Variable resistor 93 is connected between the cathode 84 to the positive terminal of battery 91 so that the bias applied thereby may be readily adjusted. The negative terminal of battery 91 is grounded at 95 and the same is, in turn, connected through a ground connection 97 and a resistor 99 to the cathode 84 of the electronic valve 85 so that, upon the condenser 72 being charged to a sufficient degree, there will be applied a positive charge to the control grid 82 causing the electronic valve 85 to fire and effect energization of winding 89 controlling the cutoff relay 75. Energization of winding 89 will, in turn, cause relay switch member 100 to open a cooperating switch contact 103 and thereby open a circuit controlling the operating condition of an erection system for a vertical gyro, indicated by the numeral 105, so as to render the same inoperative as upon the aircraft turning at or above a predetermined rate; while upon the craft coming out of the turn, the cutoff relay winding 89 may become deenergized upon the condenser 72 discharging, as heretofore described. Upon such discharge of the condenser 72, the positive charge applied to the control grid 82 is reduced so as to cut off the flow of electronic energy through the electronic valve 85 and cause deenergization of the relay winding 89, whereupon the relay switch member 100 closes the contact 103 to return the erection system to an operative condition.

As will be seen from the foregoing, in operation, the time delay circuit will provide an erection cutoff of the vertical gyro of an aircraft when turning at or above a given rate. A feature of the operation of this circuit is the sustained delay in the erection cutoff when the craft enters a turn and a fast erection cut-in when the craft comes out of the turn. Thus, under such sustained delay, the integration of yaw rate signals during normal control variation about zero will not cause erection cutoff, and the rejection of quadrature and harmonic signals is another feature since the desired steady state yaw rate threshold signal level may be less than the noise level.

The time delay determining means are shown as the variable resistors 71 and 74. The energizing time delay may be either longer or shorter than the deenergizing delay depending upon which way the shunting rectifier 69 or 80 is connected by the adjustment of the switches 65 and 67. For the purpose of versatility, the operation is shown as being selected by adjustment of the double-pole double-throw switch 65—67. The energizing and deenergizing time delays may be adjusted independently by means of the variable resistors 71 and 74 in the control circuit of the grid 82.

Static current in the relay 75 and electronic valve 85 may be readily adjusted by means of the adjustable biasing resistor 93. This value is selected to accommodate the relay and/or time requirements.

Although but one embodiment of the invention has been illustrated, various changes can be made in the design and arrangement of the parts without departing from the spirit and scope of the invention as the same will now be understood by those skilled in the art.

What is claimed is:

1. For use in an aircraft including a yaw rate gyro and an erection system for a gyro; the combination comprising means to control the operative condition of the gyro erection system, means responsive to said yaw rate gyro in one sense to render the erection system inoperative when the craft makes a turn at a rate in excess of a predetermined value and in another sense to render the erection system operative when the craft comes out of the turn, and a timing device to render the response of said last-mentioned means to said yaw rate gyro relatively slower in one of said senses than in the other of said senses.

2. The combination defined by claim 1 including operator-operative switch means to control said timing means so as to render the response of said last-mentioned means selectively slower in one or the other of said senses.

3. For use in an aircraft including a yaw rate gyro having an electrical signal output and an electrically controlled erection system for a gyro; the combination comprising a demodulator network, a bridge rectifier network, an electrical timing network, and electrical relay means responsive to the yaw rate gyro output signal applied through said networks to render the electrically operated erection system inoperative when the craft makes a turn at a rate in excess of a predetermined value, said output signal decreasing upon the craft coming out of the turn to render the erection system operative, and said electrical timing network effective to render the relay means relatively slowly responsive to said yaw rate gyro output signal.

4. The combination defined by claim 3 in which said timing network includes an electronic valve having a plate, cathode and control grid, a timing condenser connected across the cathode and control grid, means operatively connecting the relay means in circuit with the plate and cathode of the electronic valve, circuit means for charging the timing condenser in response to the output signal from the yaw rate gyro, including a timing resistor to provide a sustained delay period, other circuit means for discharging the timing condenser upon cessation of the output signal from the yaw rate gyro at a relatively rapid rate, and said other circuit means including a rectifier shunting said timing resistor to render the other circuit means ineffective to charge said condenser.

5. Means for controlling an operative condition of an erection system for an aircraft gyro; comprising aircraft turn responsive means, first timing means operatively controlled by said turn responsive means and effective to render the erection system inoperative after a predetermined delay period, and second timing means operatively controlled by said turn responsive means and effective to render the erection system operative after a second predetermined delay period upon the craft coming out of the turn.

References Cited in the file of this patent

UNITED STATES PATENTS

| | | |
|---|---|---|
| 2,589,874 | Seliger | Mar. 18, 1952 |
| 2,608,099 | Roush | Aug. 26, 1952 |
| 2,634,391 | Rusler | Apr. 7, 1953 |
| 2,715,709 | Schoeppel | Aug. 16, 1955 |
| 2,716,894 | Nichols et al. | Sept. 6, 1955 |
| 2,763,157 | Summers | Sept. 18, 1956 |
| 2,771,779 | Schaffer et al. | Nov. 27, 1956 |